S. S. YOUNG.
Calculator.
No. 8,329.
Patented Sept. 2, 1851.
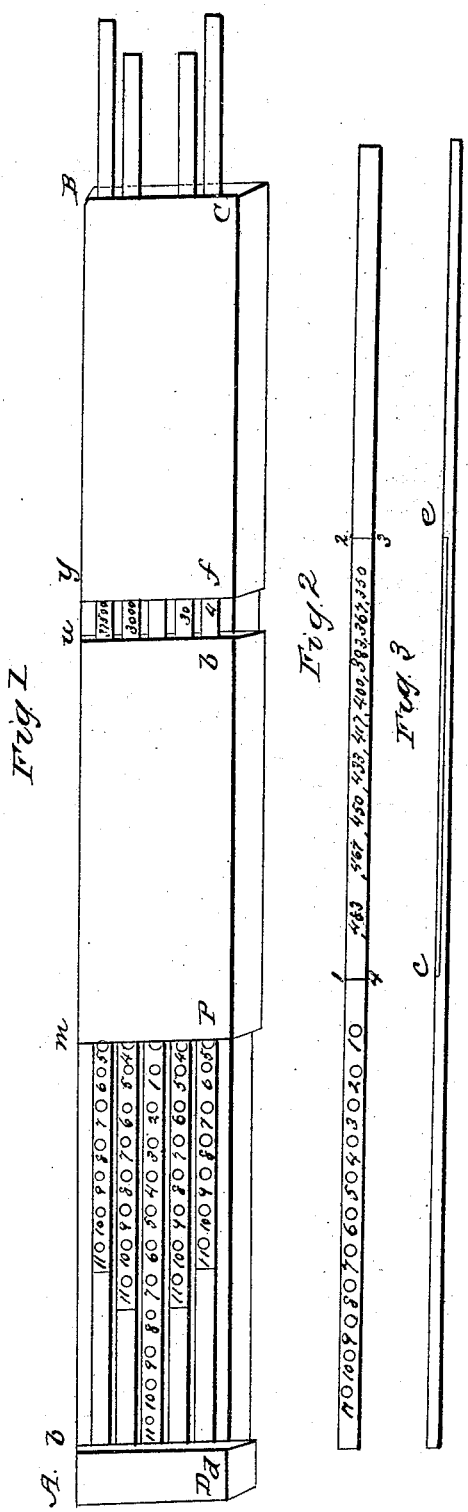

UNITED STATES PATENT OFFICE.

SAMUEL S. YOUNG, OF EATON, OHIO, ASSIGNOR TO JNO. R. STEPHEN.

RULES FOR CALCULATING INTEREST.

Specification of Letters Patent No. 8,329, dated September 2, 1851.

*To all whom it may concern:*

Be it known that I, SAMUEL S. YOUNG, of Eaton, in the county of Preble and State of Ohio, have invented a new Machine or Instrument for the Calculating of Interest and the Laying of Taxes; and I do hereby declare that the following is a full and exact description.

The nature of my invention consists in providing a simple mechanical method of performing the most difficult calculations in interest and the laying on of taxes.

To enable others, skilled in the art, to make and use my invention, I will proceed to describe its construction, and the manner of using it.

The instrument may be made of either metal or wood, fourteen inches long, one and a half inches wide, and one fourth of an inch thick, or any size that would be convenient; in this, there are five or more grooves, each $\frac{1}{5}$ of an inch wide, and one-eighth of an inch deep cut from end to end; in each groove there is a slide, which just fills it.

Figure 1, A, B, C, D, is the full size of the instrument. The left hand end of the instrument, from A, to D, is closed, so as to stop the slides, which are covered in part by three cross bars. A, $b$, $d$, D, is $\frac{6}{10}$ of an inch wide. $b$, $m$, $p$, $d$, is a space of $4\frac{1}{10}$ inches in which the slides are not covered. $m$, $n$, $o$, $p$, and B, C, $f$, $y$, are bars, each covering $4\frac{1}{10}$ inches of the length of the machine. $n$, $y$, $f$, $o$, is an open space in which the slides are seen. In the space $b$, $m$, $p$, $d$, the slides are bored and numbered, from right to left, 1, 2, &c, to 11.

Fig. 2, is a side view of the middle slide. 1, 2, 3, 4, is a strip of card paper, lying in the slide.

Fig. 3, is an edge view of a slide. $c$, $e$, is a recess cut in every slide, and the card filling it. There is a set of these cards for every rate per cent. that may be needed in the laying of taxes, and the calculation of interest or discount.

To use the machine, lay the cards in their places, and hold the instrument with the bar A, $b$, $d$, D, toward your left hand. Then, for taxes, the numbers on the slides, beginning at the slide next you; represent units, tens, hundreds, thousands, and tens of thousands of dollars. Suppose then, we want the tax on $54,045, at $\frac{3}{4}$ of one mill per cent., we slip the first slide to the right, till 5, comes to the bar, the second, till 4, comes to the bar, the 4th till 4 comes to the bar, and the fifth till 5, comes to the bar; then in the space, $n$, $y$, $f$, $o$, Fig. 1, we read, on the first slide, the tax on five dollars on the second slide, the tax on forty dollars, on the fourth slide the tax on four thousand dollars, and on the fifth slide the tax on fifty thousand dollars, which added gives the whole tax on the sum named.

For calculating interest, the figures on the first three slides represent days, on the fourth slide months, and on the fifth slide years, (and so for discount) and the figures on the cards show the interest on one dollar, for the time.

What I claim as my invention and desire to secure by Letters Patent, is—

The arrangement of parallel slides substantially in the manner, and for the purposes herein set forth, one slider being for units, another for tens, another for hundreds, &c.; and each slider being so graduated and numbered as to show through the vertical openings $n$, $y$, $f$, $o$, the sum denoting the interest or tax on the numeral figure that appears on the same slider, at the side of the bar $m$, $n$, $o$, $p$, as herein described.

S. S. YOUNG.

Witnesses:
JAMES L. STREET,
J. V. CAMPBELL.